Nov. 17, 1953            H. F. SMITH            2,659,088

BOLT CLIP FOR TOILET TANK AND BOWL COMBINATION

Filed April 15, 1952

INVENTOR.
HARRY F. SMITH

BY
RICHEY, WATTS, EDGERTON & McNENNY

ATTORNEYS

Patented Nov. 17, 1953

2,659,088

UNITED STATES PATENT OFFICE 2,659,088

BOLT CLIP FOR TOILET TANK AND BOWL COMBINATION

Harry F. Smith, Lexington, Ohio, assignor to Mansfield Sanitary Pottery, Inc., Perrysville, Ohio, a corporation of Ohio Application April 15, 1952, Serial No. 282,499

3 Claims. (Cl. 4—12)

This invention relates to close coupled water closet combinations of bowl and tank and is particularly concerned with new means for securing the tank and bowl in assembled position.

Tank and bowl combinations have been made heretofore in which the bowl had an outwardly extending flange at its rear end and along the sides adjacent thereto and the tank had three bolts which extended through the bottom wall thereof and through said flanges, one of the bolts extending through the rear flange of the bowl. This construction was not satisfactory because of the difficulty in supporting the rearwardly extending flange on the bowl during firing. Consequently this rear flange has been made very short and, hence, affords a projection to which it is difficult to attach any means for holding down the tank.

In my prior Patent No. 2,590,471 is shown means by which a tank could be satisfactorily secured to a very short rear bowl flange.

While that apparatus has been found in commercial practice to be quite satisfactory, it possesses the disadvantage that several loose parts must be held in assembled relation while they are being secured in position and this sometimes requires time, patience or skill.

The present invention aims to overcome the difficulties present in the previous securing means for tank and bowl combinations and attains that object by a new combination of parts including a clip which functions in conjunction with the short rear flange and a bolt in a highly efficient manner and is readily applied.

In the drawings accompanying and forming a part of this specification:

Figure 1:
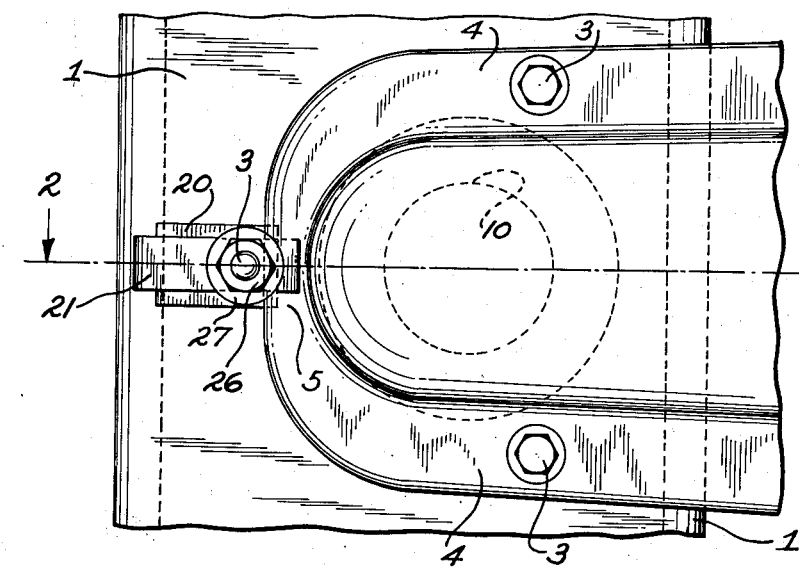
Fig. 1 is a fragmentary, bottom plan view, of a bowl and tank combination embodying the present invention.
Figure 2:
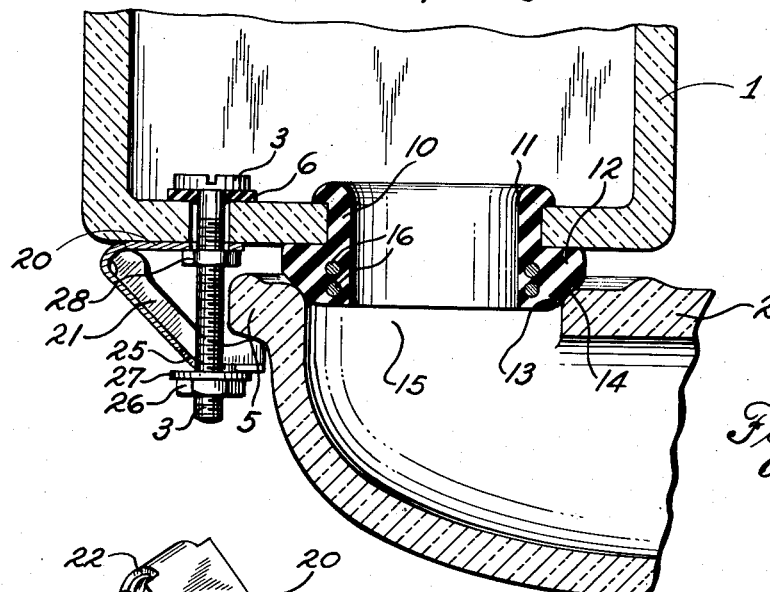
Fig. 2 is a fragmentary, vertical, sectional view taken on line 2—2 of Fig. 1.
Figure 3:
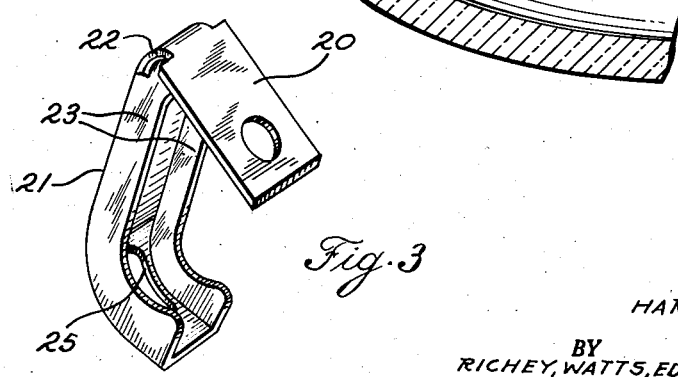
Fig. 3 is a perspective view of the securing clip of Figs. 1 and 2.

In the drawings, a part of the water-containing tank 1 is shown in assembled position on a part of bowl 2. Bolts 3 extend through holes in the bottom wall of tank 1 and two of these bolts project through holes in the side flanges 4 of bowl 2 while the third and rearmost bolt 3 extends down rearwardly of the rear flange 5 of the bowl. The usual washer 6 surrounds each of the bolts 3 and lies between the heads of the bolts and the inner surface of the bottom wall of the tank. A gasket 10 projects through a hole in the bottom of the tank, has a valve seating surface 11 at its upper end, a flange portion 12 projecting outwardly along the bottom surface of the bottom wall of the tank and conical surface 13 engaging a rounded surface 14 surrounding the water inlet opening 15 of the bowl 2. This gasket 10 may have a reinforcing wire 16 embedded therein if desired.

A clip is associated with the rear bolt 3. This clip consists of a flat strip of metal which is notched on opposite sides a short distance away from one end thereof with the edge portions of the strip from the notches to the opposite end of the strip being bent into parallel flanges and with the flanged part of the strip being bent at an acute angle to the flat portion. The flat arm of the strip 20 is flexible while the flange bearing portion 21 is channel-shaped in cross-section and is rigid as compared with the arm 20. The metal is cut away in forming notches 22 in such a manner that the ends of the flanges 23 will engage the opposed surface of the flexible arm 20 when the two arms are bent to form an acute angle, and thereby limit the extent to which that arm may be moved toward the channeled portion of the clip. The flexible flat arm 20 of the clip is provided with a round hole through which rear bolt 3 extends and the rigid arm 21 is provided with an elongated hole 25 for bolt 3. Preferably the ends of the flanges 23 remote from flexible arm 20 are rounded convexly so as to engage with the bowl and rear flange at their intersection. A nut and washer 26 and 27 are carried by the lower end of the bolt to bear against the rigid arm 21 of the clip and, if desired, a nut 28 may be positioned on the bolt to bear against the under side of the flexible arm 20 of the clip.

In using the present invention, the tank 1 with gasket 10 in place is located on the bowl 2, the side bolts 3 are placed in their aligned holes in the tank and side flanges and the nuts are turned on the bolts to pull the parts into closely assembled relation. The rear bolt 3 is placed in the hole in the tank and the clip is slipped onto the bolt with the flat flexible arm of the clip bearing against the lower surface of the bottom wall of the tank. If and when the nut 28 is to be used it is put onto the bolt before the bolt is passed through hole 25 in the rigid arm of the clip.

With the clip in position on the rear bolt and with the ends of the flanges 23 engaging the bowl at the intersection of the bowl and the rear flange thereof, nut 26 is turned on the bolt. This movement of the nut forces the flanges of the clip against the bowl and if unrestrained would result in movement of the clip out from under the bowl flange. However, this tendency to outward movement of the clip is restrained partly by the fact that the bolt cannot shift laterally in the bottom wall of the tank and partly by the flexing of the flat arm 20 of the clip with resultant engagement of substantially the entire top surface of that arm of the clip with the lower surface of the tank bottom. Thus the forces created by turning the nut on the bolt 3 which would normally act lengthwise of the channel section 21 are resolved into a vertical component and a horizontal component. The latter component is transmitted along the flexible arm of the clip 20 to the bolt 3 while the vertical component is transmitted along the longitudinal axis of the bolt 3. The bolt 3 prevents rearward movement of the clip, nut 26 forces the ends of the clip flanges against the sloping under side of flange 5, and the bolt and nut prevent the flanges from sliding off flange 5.

When the nut 28 is used the flexible arm of the clip is first clamped against the under surface of the tank and then the flanged portion 21 is clamped against the rear flange by means of nut and washer 26 and 27. In either event the elongated hole 25 in part 21 of the clip permits a limited amount of relative movement of the clip and bolt which is necessary or desirable for proper operation of the clip.

Having thus described the present invention so that others skilled in the art may be able to understand and practice the same, I state that what I desire to secure by Letters Patent is defined in what is claimed:

What is claimed is:

1. A close coupled water closet combination comprising a toilet bowl having a rear extension, flanges projecting outwardly from the sides and rear of said extension, a tank, and means securing said tank in assembled position on said bowl, said means comprising side bolts passing through the bottom of the tank and through the side flanges, a rear bolt, said clip including a rigid arm extending upwardly and rearwardly from the under side of said rear flange, and a flexible arm integral with and extending forwardly from the upper end of said rigid arm to engage the bottom of the tank, a rear bolt passing through the bottom of the tank past the edge of the rear flange and through the free ends of said arms, and a nut on the rear bolt to urge the flexible and rigid arms against the bottom wall of the tank and the rear flange of the bowl, respectively.

2. A close coupled water closet combination comprising a toilet bowl having a rear extension, a flange projecting outwardly from said extension, a tank, and means securing said tank in assembled position on said bowl, said means comprising a generally V-shaped clip including a rigid arm and a flexible arm, said rigid arm being preferably channel-shaped in cross-section with a flat web and upstanding parallel side flanges having rounded ends and said flexible arm being flat and integrally connected to the web of the rigid arm and engageable with the adjacent rounded ends of the side flanges, a bolt extending through the bottom wall of the tank and through the free ends of said arms, a nut on the bolt engaging the under side of the flexible arm and clamping it against the bottom wall of the tank, and means on the bolt engaging the under side of the web of said rigid arm and urging the rounded ends of the flanges at the free end of the rigid arm against the under side of the flange on the bowl.

3. A close coupled water closet combination comprising a toilet bowl having a rear extension, a flange projecting outwardly from said extension, a tank, and means securing said tank in assembled position on said bowl, said means comprising a flange, a clip on said bolt, said clip including a rigid arm extending upwardly and rearwardly from the under side of said flange, and a substantially horizontal arm engaging the under side of said tank and extending forwardly from the upper end of said rigid arm, a rear bolt passing through the bottom of the tank and extending past the rear edge of said flange and through the free ends of the arms of said clip, a nut on said bolt to clamp it against the bottom of the tank, and a nut on said bolt engaging the under side of said rigid arm to urge it upwardly against the flange of the bowl.

HARRY F. SMITH.

References Cited in the file of this patent

UNITED STATES PATENTS

| Number | Name | Date |
|---|---|---|
| 1,676,124 | Wilkie | July 3, 1928 |
| 2,520,575 | Smith | Aug. 29, 1950 |
| 2,590,471 | Smith | Mar. 25, 1952 |